United States Patent
Schmitt

(10) Patent No.: US 9,334,165 B2
(45) Date of Patent: May 10, 2016

(54) LOW-VISCOSITY LIQUID SULFUR

(71) Applicant: Arkema France, Colombes (FR)

(72) Inventor: Paul Guillaume Schmitt, Lescar (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/404,751

(22) PCT Filed: May 28, 2013

(86) PCT No.: PCT/FR2013/051180
§ 371 (c)(1),
(2) Date: Dec. 1, 2014

(87) PCT Pub. No.: WO2013/178930
PCT Pub. Date: Dec. 5, 2013

(65) Prior Publication Data
US 2015/0118140 A1    Apr. 30, 2015

(30) Foreign Application Priority Data

Jun. 1, 2012 (FR) ...................... 12 55140

(51) Int. Cl.
*C01B 17/02* (2006.01)
*C01B 17/12* (2006.01)
*C09K 5/12* (2006.01)

(52) U.S. Cl.
CPC ............ *C01B 17/0243* (2013.01); *C01B 17/02* (2013.01); *C09K 5/12* (2013.01)

(58) Field of Classification Search
CPC ...... C01B 17/0243; C01B 17/12; C01B 17/02
USPC ..................................................... 423/567.1
See application file for complete search history.

(56) References Cited

U.S. PATENT DOCUMENTS

| | | | | | |
|---|---|---|---|---|---|
| 3,453,125 | A | * | 7/1969 | Williams | ............ C01B 17/0243 106/287.32 |
| 3,510,329 | A | * | 5/1970 | Martin | ................. C04B 28/36 106/287.21 |
| 3,846,311 | A | * | 11/1974 | Sharp et al. | ........... C01B 17/033 134/22.14 |
| 3,965,067 | A | * | 6/1976 | Jin | ...................... C01B 17/0243 106/287.24 |
| 4,184,890 | A | * | 1/1980 | Bertozzi | ............. C01B 17/0243 106/287.26 |
| 4,239,630 | A | * | 12/1980 | Atkinson | ............... C09K 8/532 134/22.14 |
| 5,186,848 | A | * | 2/1993 | Carroll | .................... C01B 17/02 252/364 |
| 2010/0084315 | A1 | * | 4/2010 | Mesters | ............. C01B 17/0232 208/189 |
| 2011/0259552 | A1 | | 10/2011 | Sterzel | |
| 2013/0037741 | A1 | | 2/2013 | Birnbaum | |

FOREIGN PATENT DOCUMENTS

| | | |
|---|---|---|
| DE | 2725670 | 12/1977 |
| WO | 2011131610 | 10/2011 |

OTHER PUBLICATIONS

International Search Report for International Application No. PCT/FR2013/051180 mailed Oct. 1, 2013.
International Preliminary Report on Patentability and English Translation of the Written Opinion of the International Searching Authority for PCT/FR2013/051180 mailed Dec. 2, 2014.

* cited by examiner

*Primary Examiner* — Timothy Vanoy
(74) *Attorney, Agent, or Firm* — RatnerPrestia

(57) ABSTRACT

The invention relates to the use of at least one compound of formula (1):

$$R-S_n-R' \qquad (1)$$

wherein R and R' are each a hydrocarbon radical containing between 1 and 12 carbon atoms and n is a whole number between 1 and 8, for maintaining the viscosity of liquid sulfur at a value lower than 60,000 mPa·s, preferably lower than 30,000 mPa·s, especially preferably lower than 10,000 mPa·s. The invention also relates to a method for preparing low-viscosity liquid sulfur and to liquid sulfur compositions comprising at least one compound of formula (1).

20 Claims, No Drawings

US 9,334,165 B2

LOW-VISCOSITY LIQUID SULFUR

CROSS-REFERENCE TO RELATED APPLICATIONS

This application is a national phase filing of International Application No. PCT/FR2013/051180, filed May 28, 2013, which claims priority from French Application No. 1255140, filed Jun. 1, 2012. The entire disclosure of each of these applications is incorporated herein by reference in its entirety for all purposes.

FIELD OF THE INVENTION

The present invention relates to the field of sulfur, and in particular to that of liquid sulfur, i.e. sulfur in molten form. More particularly, the invention relates to an additive for reducing the viscosity of sulfur in molten form, and to low-viscosity compositions based on liquid sulfur comprising such an additive, and also to the use of said compositions.

DISCUSSION OF THE RELATED ART

Sulfur is nowadays very widely and commonly used in numerous industrial fields, especially in the chemical industry as a synthetic reagent for the preparation of various chemical compounds, for instance, in a nonlimiting manner, sulfuric acid ($H_2SO_4$), sulfur dioxide ($SO_2$), oleums ($SO_3$), carbon disulfide ($CS_2$), sulfites or sulfates for the papermaking industry, phosphorus pentasulfide as a lubricant, but also in its native form (sulfur) for the vulcanization of tires, formulated sulfur in agriculture, sulfur polymers for cements and concretes, and also sulfur as a heat-transfer or heat-storage fluid, especially for power stations (thermal or nuclear), for solar panels (cf. for example, US 2011/0 259 552), and the like.

Sulfur, which is atomic number 16 in the Mendeleev Periodic Table of the Elements, is solid at room temperature, liquid at and above 115° C. (melting point) and up to 444° C., at which temperature it becomes gaseous (boiling point).

In the majority of the industrial applications mentioned previously, it is very commonly necessary to store, transport, use or react sulfur in liquid form. However, one of the major drawbacks of liquid sulfur is that when the temperature increases, its viscosity increases considerably to reach a maximum at about 180° C.-200° C., and then gradually falls again at higher temperatures (400° C.).

More specifically, the viscosity of sulfur is less than 10 mPa·s at about 130° C., rises abruptly at and about 150° C.-160° C. and reaches about 100 000 mPa·s at about 200° C., to fall again to a few tens of mPa·s at temperatures of 300° C. and higher.

This very high viscosity of sulfur, especially between about 150° C. and about 300° C., poses major problems at all the levels of the industrial processes that use this liquid element, at the very least in reaction units, but also logistically, for the storage, transportation and transfer of sulfur in the various feed lines, pipes, tubes, valves, pumps and other components in which sulfur must circulate.

Besides this high viscosity, at the abovementioned temperatures, another drawback of liquid sulfur is that its viscosity varies widely and nonlinearly as a function of the temperature. It is thus necessary to finely control the temperature of liquid sulfur in order to avoid large variations in viscosity, especially in the temperature range from 150° C. to 300° C., and so as not to perturb industrial installations using liquid sulfur.

Few solutions exist in the prior art for overcoming these viscosity-related drawbacks. The solution that appears to be the most suitable was presented by Rocco Fanelli (*Industrial and Engineering Chemistry*, vol. 38(1), January 1946, pages 39-43), who proposed the addition of halogens, sulfurized hydrogen sulfide or hydrogen persulfide, in liquid sulfur, to obtain a constant viscosity at temperatures above 160° C.

Much more recently, patent application US 2011/0 259 552 also indicates that the addition of hydrogen sulfide makes it possible to significantly reduce the viscosity of liquid sulfur. It is also indicated in said document that $H_2S$ may be generated in situ, for example with NaHS.

Thus, from 1946 to the present time, there does not appear to have been any alternative to the addition of hydrogen sulfide to liquid sulfur in order to reduce its viscosity. However, the dangers associated with the use of hydrogen sulfide are well known, and it would be entirely advantageous to be able to avoid the use of this highly toxic gas. In addition, the sulfanes as described in column 1, page 2 of patent application US 2011/0 259 552 are known to be unstable and to release hydrogen sulfide $H_2S$.

Patent application WO 2011/131 610 discloses a heat-transfer fluid comprising sulfur and at least one organohalogen derivative, which makes it possible to reduce the viscosity of sulfur brought to a temperature from 120° C. to 400° C. This halogen derivative may be used alone or as a mixture with other additives, for example polysulfides of formula $R_1S_xR_2$, in which x takes the values 2 to 8, and $R_1$ and $R_2$ are alkyl residues comprising from 2 to 18 carbon atoms and in particular from 9 to 12 carbon atoms. The solution provided by said patent application to the problem of the viscosity of liquid sulfur mandatorily uses one or more halogen compounds, which are often toxic and may give rise to substantial problems of corrosion of plants, in particular at the temperatures under consideration.

SUMMARY OF THE INVENTION

Thus, a first object of the present invention consists in proposing a simple and efficient means for maintaining liquid sulfur at a viscosity that is suitable for the uses for which it is intended, or even for obtaining a viscosity of liquid sulfur that is at least equal to or better still lower than that observed, for an equivalent temperature, for liquid sulfur supplemented with hydrogen sulfide.

According to another object, the present invention consists in proposing an additive for maintaining the viscosity of liquid sulfur at values below 60 000 mPa·s, preferably below 30 000 mPa·s, more preferably below 10 000 mPa·s, or even below 5000 mPa·s, said additive not having the drawbacks related to the toxicity, the risks of corrosion, the handling difficulties and the like encountered with the known additives of the prior art.

Preferentially, and according to yet another object, the present invention consists in proposing an additive for maintaining the viscosity of liquid sulfur at values below 5000 mPa·s, preferably below 3000 mPa·s, more preferably below 2000 mPa·s, or even below 1000 mPa·s, or even below 500 mPa·s, said additive not having the drawbacks related to the toxicity, the risks of corrosion, the handling difficulties and the like encountered with the known additives of the prior art.

The abovementioned objects, but also others that will emerge hereinbelow, are now achieved in total, or at least in part, by means of the present invention, the detailed description of which follows.

DETAILED DESCRIPTION OF CERTAIN EMBODIMENTS OF THE INVENTION

The inventors have now discovered that the addition of at least one dialkyl monosulfide, disulfide and/or polysulfide, in small amount to liquid sulfur, makes it possible to reduce its viscosity, within the limits indicated above.

More specifically, the invention relates first to the use of at least one compound of general formula (1):

$$R—S_n—R' \qquad (1)$$

in which:
- R and R', which may be identical or different, represent, independently of each other, a linear or branched hydrocarbon-based radical, containing from 1 to 12 carbon atoms and optionally one or more unsaturations in the form of double and/or triple bonds;
- n represents an integer between 1 and 8, limits inclusive, preferably between 1 and 6, limits inclusive, more preferably between 1 and 4, limits inclusive, more preferentially between 2 and 8, limits inclusive, better still between 2 and 6, and most particularly between 2 and 4, limits inclusive;

for maintaining the viscosity of liquid sulfur at a value below 60 000 mPa·s, preferably below 30 000 mPa·s, more preferably below 10 000 mPa·s and advantageously below 5000 mPa·s.

According to a preferred embodiment, the present invention relates to the use of at least one compound of general formula (1) as defined previously for maintaining the viscosity of liquid sulfur at a value below 5000 mPa·s, preferably below 3000 mPa·s, more preferably below 2000 mPa·s, or even below 1000 mPa·s, or even below 500 mPa·s.

For the purposes of the invention, preference is given, according to the first embodiment, to the compounds of formula (1) for which R and R' represent, independently of each other, a saturated hydrocarbon-based radical (alkyl radical) containing from 1 to 12 carbon atoms, preferably from 1 to 6 carbon atoms and more preferably from 1 to 4 carbon atoms.

According to another embodiment of the present invention, preference is given to the compounds of formula (1) for which the hydrocarbon-based radicals R and R' are identical.

According to yet another embodiment, the compounds of the present invention are chosen from those for which R and R' represent, independently of each other, a saturated hydrocarbon-based radical (alkyl radical) containing from 1 to 6 carbon atoms, preferably from 1 to 4 carbon atoms, and n represents an integer between 2 and 8, preferably between 2 and 6, limits inclusive, more preferably n represents 2, 3 or 4, and more preferentially n is equal to 2. More preferably, the radicals R and R' are identical. A very significant reduction in the viscosity of liquid sulfur was observed with the compounds of formula (1) in which n is greater than or equal to 2, especially between 2 and 8.

The preferred alkyl radicals R and R' are thus chosen from methyl, ethyl, propyl, butyl, pentyl and hexyl, in linear or branched form.

Among the compounds of formula (1), the ones that are most particularly preferred are dimethyl sulfide (DMS), diethyl sulfide (DES), dipropyl sulfide (DPS), dibutyl sulfide (DBS), dimethyl disulfide (DMDS), diethyl disulfide (DEDS), dipropyl disulfide (DPDS) and dibutyl disulfide (DBDS), the trisulfide homologs thereof, the tetrasulfide homologs thereof, the pentasulfide homologs thereof and the hexasulfide homologs thereof, alone or as mixtures of two or more thereof in all proportions, it being understood that the propyl and butyl radicals may be in linear or branched form, for example n-propyl, isopropyl, n-butyl, isobutyl, sec-butyl and tert-butyl.

According to an entirely preferred aspect, the present invention relates to the abovementioned use in which the compound of formula (1) is chosen from DMDS, DEDS, DPDS and DBDS, and also mixtures of two or more thereof in all proportions.

The compounds of formula (1) are well known to those skilled in the art and are either commercially available or readily prepared from known procedures available in the scientific literature, the patent literature, Chemical Abstracts or on the Internet.

In the particular case of the dialkyl disulfides, they may be, for example, in the form of mixtures known as DSOs (meaning disulfide oils) and which are the products of oxidation of mercaptans, especially thus treated on gas extraction fields.

According to a most particularly preferred aspect of the present invention, the compound of formula (1) is DMDS, which has shown entirely satisfactory results with respect to the viscosity of molten sulfur, and which also has the advantage of being an easily manipulable liquid with toxicological properties that are much more favorable than those of $H_2S$.

Contrary to the teaching of the prior art (reduction of the viscosity of liquid sulfur with $H_2S$ or an $H_2S$ generator), the compounds of formula (1), in particular the dialkyl disulfides and especially DMDS, do not generate any $H_2S$ at temperatures below 350-400° C. Without wishing to be bound by theory, it is thus possible to imagine that with these compounds of formula (1), it is the radicals R—S (or R'—S, R and R' being as defined previously) and not the SH radicals (as in the case of $H_2S$) which prevent the appearance of the viscosity peak of liquid sulfur in the temperature range 170° C.-220° C.

The amount of at least one compound of formula (1) necessary to lower the viscosity of liquid sulfur, especially within the temperature range 170° C.-220° C., may vary within wide proportions, but is generally relatively low, and, by way of example, may be between 0.0001 mol and 1 mol of at least one compound of formula (1) per 100 mol of sulfur, preferably between 0.001 mol and 1 mol of at least one compound of formula (1) per 100 mol of sulfur and more preferably between 0.001 mol and 0.5 mol of at least one compound of formula (1) per 100 mol of sulfur.

When the compound of formula (1) is DMDS, the amount of DMDS in the liquid sulfur may be, for example, between 0.001% by weight and 1% by weight and preferably between 0.001% by weight and 0.5% by weight relative to the amount of sulfur.

According to a preferred embodiment, said at least one compound of formula (1) described previously used for reducing the viscosity of liquid sulfur does not comprise any other additives, and in particular does not comprise any other additives that are toxic or harmful to live beings and to the environment or that are liable to modify or impair the properties of the liquid sulfur thus supplemented.

In a most particularly preferred embodiment of the present invention, said at least one compound of formula (1) is used without addition of organohalogen compound. As indicated previously, organohalogen compounds may be responsible for the corrosion of the various installations in which liquid sulfur circulates, not to mention the fact that such halogen compounds are known to be toxic both to live beings and to the environment.

According to another aspect, the present invention relates to the process for preparing liquid sulfur, said process comprising at least one step of introducing, into the sulfur in solid form or in molten form, an effective amount of at least one compound of formula (1) as defined previously.

The term "effective amount" means an amount of between 0.0001 mol and 1 mol of at least one compound of formula (1) per 100 mol of sulfur, preferably between 0.001 mol and 1 mol of at least one compound of formula (1) per 100 mol of sulfur and more preferably between 0.001 mol and 0.5 mol of at least one compound of formula (1) per 100 mol of sulfur.

The compound(s) of formula (1) may be introduced in solid, liquid or even gaseous form, depending on the nature of the compound(s) of formula (1), and depending on the method of administration into the solid or liquid sulfurs.

The compound(s) of formula (1) may be introduced, for example, in liquid form, by mixing with sulfur, by introduction using a nozzle, a sprayer, directly into the sulfur melting reactor, or alternatively into a liquid sulfur transport pipe, and any other method for introducing a solid, liquid or gaseous additive into a solid or a liquid, which is known to those skilled in the art.

According to yet another aspect, the present invention relates to a liquid sulfur composition, at a temperature of between 115° C. and 440° C., and comprising at least one compound of formula (1) as defined previously, in the proportions as indicated previously.

The composition according to the present invention thus has a low viscosity, below the viscosity of pure sulfur at the same temperature, and especially a viscosity below 60 000 mPa·s, preferably below 30 000 mPa·s, more preferably below 10 000 mPa·s and advantageously below 5000 mPa·s.

In addition, it has been discovered, surprisingly, that the use of at least one compound of formula (1) makes it possible to reduce the viscosity of liquid sulfur entirely satisfactorily, without it being necessary to add another additive, especially an organohalogen additive. Thus, and according to a preferred aspect, the composition of the present invention defined above does not comprise any organohalogen compound, especially for the reasons mentioned previously.

The composition according to the present invention thus finds an entirely advantageous use in many industrial fields, for instance, in a nonlimiting manner, as a synthetic reagent for the preparation of chemical compounds, but also in unmodified form (sulfur) for the vulcanization of tires, the preparation of formulated sulfur in agriculture, sulfur for cements and concretes, and also sulfur as a heat-transfer or heat-storage fluid, especially for power stations or for solar panels, and the like, to mention but the main uses of liquid sulfur known to those skilled in the art.

The examples that follow serve to illustrate the invention without, however, providing any limitation to the embodiments presented above.

Example 1

Test with Diethyl Sulfide (DES)

The following procedure is performed:
preground solid sulfur (25 g) is placed in a disposable aluminum measuring chamber,
the desired amount of DES is placed in the bottom of the disposable chamber and is covered with 25 g of sulfur,
the measuring chamber is placed in the oven of a Brookfield LV-DVIII+ model viscometer,
the desired temperature (between 115° C. and 250° C.) is set on the programmer that controls the oven,
the sulfur liquefies at and above 115° C., and 8.5 g of sulfur are then added using a metal funnel so as to bring the total amount of sulfur in the measuring chamber to 33.5 g,
when all the sulfur is in liquid form, the viscometer rotor is lowered to the reference mark on the spindle stem,
the oven lid is then placed on the orifice of the measuring chamber, and the parameters are set on the LV-DVIII+ viscometer: selection of the desired spindle and selection of the desired spindle spin speed,
the analysis is then started and the results are collected.

The viscosities obtained at 195° C. are as follows:
sulfur alone: 98 667 mPa·s
sulfur+0.1% by weight of DES: 57 000 mPa·s The addition, to the sulfur, of a small weight amount of a dialkyl monosulfide, such as DES, makes it possible to obtain a very significant reduction in the viscosity of the liquid sulfur at 195° C.

Example 2

Test with Dimethyl Disulfide (DMDS)

The same procedure as that of Example 1 is performed, replacing the DES with DMDS.

The viscosities obtained at 195° C. are as follows:
sulfur alone: 98 667 mPa·s
sulfur+0.1% by weight of DMDS: <1000 mPa·s The addition, to the sulfur, of a small weight amount of a dialkyl disulfide, such as DMDS, thus makes it possible to considerably reduce the viscosity of the liquid sulfur, at 195° C.

The invention claimed is:

1. A method of lowering the viscosity of sulfur in molten form, comprising mixing with sulfur an effective amount of at least one compound of general formula (1):

$$R-S_n-R' \qquad (1)$$

in which:
R and R', which may be identical or different, represent, independently of each other, a linear or branched hydrocarbon-based radical, containing from 1 to 12 carbon atoms and optionally one or more unsaturations in the form of double and/or triple bonds; and
n represents an integer between 1 and 8, limits inclusive;
wherein no additive other than the at least one compound of general formula (1) is present.

2. The method as claimed in claim 1, wherein the at least one compound of formula (1) is chosen from those for which R and R' represent, independently of each other, a saturated hydrocarbon-based radical (alkyl radical) containing from 1 to 12 carbon atoms.

3. The method as claimed in claim 1, wherein the hydrocarbon-based radicals R and R' of the at least one compound of formula (1) are identical.

4. The method as claimed in claim 1, wherein the at least one compound of formula (1) is chosen from those for which R and R', represent, independently of each other, an alkyl radical containing from 1 to 6 carbon atoms, and n represents an integer between 2 and 6, limits inclusive.

5. The method as claimed in claim 1, wherein the at least one compound of formula (1) is selected from the group consisting of dimethyl sulfide, diethyl sulfide, dipropyl sulfide, dibutyl sulfide, dimethyl disulfide, diethyl disulfide, dipropyl disulfide and dibutyl disulfide, the trisulfide homologs thereof, the tetrasulfide homologs thereof, the pentasulfide homologs thereof and the hexasulfide homologs thereof, alone or as mixtures of two or more thereof in all proportions.

6. The method as claimed in claim 1, wherein the at least one compound of formula (1) is selected from the group consisting of DMDS, DEDS, DPDS and DBDS, and also mixtures of two or more thereof in all proportions.

7. The method as claimed in claim 1, wherein the amount of at least one compound of formula (1) is between 0.0001 mol and 1 mol per 100 mol of sulfur.

8. The method as claimed in claim 1, wherein n represents an integer between 2 and 6, limits inclusive.

9. The method as claimed in claim 1, wherein n represents an integer between 1 and 4, limits inclusive.

10. The method as claimed in claim 1, wherein the at least one compound of formula (1) is chosen from those for which R and R' represent, independently of each other, a saturated hydrocarbon-based radical (alkyl) radical containing from 1 to 6 carbon atoms.

11. The method as claimed in claim 1, wherein the at least one compound of formula (1) is chosen from those for which R and R' represent, independently of each other, a saturated hydrocarbon-based radical (alkyl) radical containing from 1 to 4 carbon atoms.

12. The method as claimed in claim 1, wherein the amount of at least one compound of formula (1) is between 0.001 mol and 1 mol per 100 mol of sulfur.

13. The method as claimed in claim 1, wherein the amount of at least one compound of formula (1) is between 0.001 mol and 0.5 mol per 100 mol of sulfur.

14. A process for preparing liquid sulfur, comprising at least one step of introducing, into sulfur in solid form or in molten form, an amount of between 0.0001 mol and 1 mol per 100 mol of sulfur of at least one compound of formula (1):

$$R-S_n-R' \quad (1)$$

in which R and R', which may be identical or different, represent, independently of each other, a linear or branched hydrocarbon-based radical, containing from 1 to 12 carbon atoms and optionally one or more unsaturations in the form of double and/or triple bonds and n represents an integer between 1 and 8, limits inclusive, wherein no additive other than the at least one compound of general formula (1) is present.

15. A liquid sulfur composition, at a temperature of between 115° C. and 440° C., comprising sulfur and, in an amount of between 0.0001 mol and 1 mol per 100 mol of sulfur, at least one compound of formula (1):

$$R-S_n-R' \quad (1)$$

in which R and R', which may be identical or different, represent, independently of each other, a linear or branched hydrocarbon-based radical, containing from 1 to 12 carbon atoms and optionally one or more unsaturations in the form of double and/or triple bonds and n represents an integer between 1 and 8, limits inclusive, wherein no additive other than the at least one compound of general formula (1) is present.

16. The composition as claimed in claim 15, wherein the at least one compound of formula (1) is chosen from those for which R and R' represent, independently of each other, a saturated hydrocarbon-based radical (alkyl radical) containing from 1 to 12 carbon atoms.

17. The composition as claimed in claim 15, wherein the hydrocarbon-based radicals R and R' of the at least one compound of formula (1) are identical.

18. The composition as claimed in claim 15, wherein the at least one compound of formula (1) is chosen from those for which R and R', represent, independently of each other, an alkyl radical containing from 1 to 6 carbon atoms, and n represents an integer between 2 and 6, limits inclusive.

19. The composition as claimed in claim 15, wherein the at least one compound of formula (1) is selected from the group consisting of dimethyl sulfide, diethyl sulfide, dipropyl sulfide, dibutyl sulfide, dimethyl disulfide, diethyl disulfide, dipropyl disulfide and dibutyl disulfide, the trisulfide homologs thereof, the tetrasulfide homologs thereof, the pentasulfide homologs thereof and the hexasulfide homologs thereof, alone or as mixtures of two or more thereof in all proportions.

20. The composition as claimed in claim 15, wherein the amount of at least one compound of formula (1) is between 0.0001 mol and 1 mol per 100 mol of sulfur.

* * * * *